US010752423B2

(12) United States Patent
Shanmugavelayudam et al.

(10) Patent No.: US 10,752,423 B2
(45) Date of Patent: Aug. 25, 2020

(54) SYSTEM FOR THERMALLY-MANAGED TRANSPORTATION AND STORAGE OF SETS OF RELATED SPECIFIC PERISHABLE PRODUCTS

(71) Applicant: MaxQ Research LLC, Stillwater, OK (US)

(72) Inventors: Saravan Kumar Shanmugavelayudam, Stillwater, OK (US); Shoaib Shaikh, Stillwater, OK (US); Balaji Jayakumar, Stillwater, OK (US); Arif Rahman, Stillwater, OK (US); Tyler Rapp, Stillwater, OK (US)

( * ) Notice: Subject to any disclaimer, the term of this patent is extended or adjusted under 35 U.S.C. 154(b) by 205 days.

(21) Appl. No.: 15/996,503

(22) Filed: Jun. 3, 2018

(65) Prior Publication Data

US 2019/0367249 A1 Dec. 5, 2019

(51) Int. Cl.
*B62B 5/06* (2006.01)
*B65D 81/38* (2006.01)
*B65D 25/04* (2006.01)
*B65D 25/28* (2006.01)
*B65D 21/02* (2006.01)
*B62B 1/00* (2006.01)
*B62B 1/16* (2006.01)
*A01N 1/02* (2006.01)

(52) U.S. Cl.
CPC ....... *B65D 81/3813* (2013.01); *A01N 1/0273* (2013.01); *B62B 1/006* (2013.01); *B62B 1/008* (2013.01); *B62B 1/16* (2013.01); *B62B 5/06* (2013.01); *B65D 21/0215* (2013.01); *B65D 25/04* (2013.01); *B65D 25/28* (2013.01)

(58) Field of Classification Search
CPC .................................................... A01N 1/0273
See application file for complete search history.

(56) References Cited

U.S. PATENT DOCUMENTS

| 5,493,874 A * | 2/1996 | Landgrebe .............. A47J 47/14 62/263 |
|---|---|---|
| 6,028,293 A | 2/2000 | Nagle et al. |
| 6,482,332 B1 | 11/2002 | Malach |
| 7,908,870 B2 | 3/2011 | Williams et al. |

(Continued)

FOREIGN PATENT DOCUMENTS

EP 1420573 A1 5/2004

OTHER PUBLICATIONS

MaxQ Research; "Blood Cooler Storage + Transport"; retrieved on Mar. 7, 2018 from http://packmaxq.com/blood-packaging.

(Continued)

*Primary Examiner* — James A Shriver, II
*Assistant Examiner* — James J Triggs
(74) *Attorney, Agent, or Firm* — Robert H. Frantz (57) ABSTRACT

A storage and shipping container system for a set of specific related components, such as multiple blood products, which conveys the components in pre-determined ratios, having a thermally-insulated main container with a plurality of internal chambers, and at least one attached auxiliary container which is thermally-insulated. Optionally, the system is provided with wheels and a collapsible handle for easy movement of one system, and configured for stacking of multiple similar systems for bulk transportation.

20 Claims, 8 Drawing Sheets

(56) References Cited

U.S. PATENT DOCUMENTS

| | | | |
|---|---|---|---|
| 8,256,156 B1* | 9/2012 | Burgoyne, Jr. | A01K 97/06 206/315.11 |
| 9,027,782 B1 | 5/2015 | Shanmugavelayudam et al. | |
| 9,751,682 B2 | 9/2017 | Mayer et al. | |
| 9,798,994 B2 | 10/2017 | Mayer | |
| 10,342,737 B1 | 7/2019 | Shanmugavelayudam et al. | |
| 10,443,918 B2 | 10/2019 | Li et al. | |
| 2002/0099567 A1 | 7/2002 | Joao | |
| 2004/0151851 A1 | 8/2004 | Miller | |
| 2007/0032774 A1* | 2/2007 | Glade | A61J 1/165 604/403 |
| 2008/0135564 A1 | 6/2008 | Romero | |
| 2012/0197810 A1 | 8/2012 | Haarmann et al. | |
| 2013/0289927 A1 | 10/2013 | Smith et al. | |
| 2015/0241120 A1 | 8/2015 | Mayer | |

OTHER PUBLICATIONS

MaxQ Research; "Donor Tub Shipper", retrieved on Mar. 7, 2018 from http://packmaxq.com/blood-packaging.

MaxQ Research; "Platelet Shipper", retrieved on Mar. 7, 2018 from http://packmaxq.com/blood-packaging.

MaxQ Research; "Red Blood Cell Shipper", retrieved on Mar. 7, 2018 from http://packmaxq.com/blood-packaging.

MaxQ Research; "Improving the Blood Supply Chain with Advanced Shipping and Storage Materials", published online 10/2017.

MaxQ Research; "Package design, testing & evaluation", retrieved on Mar. 7, 2018 from http://packmaxq.com/blood-packaging.

Fadeyi, et al.; "Implementaiton of a new blood carrier cooler insert and tracking technology with educational initiatives and its effect on reducing red blood cell wastage"; vol. 57, Oct. 2017, Transfusion, pp. 2477-2482.

Temptime; Cooler validation survey results—Mar. 2012 ; retrieved on Mar. 21, 2018 from http://williamlabs.com/aabb-topics-guidelines/cooler-validation-survey-results-march-2012/.

Coolpac; "Blood Transport & Validated Temperature Controlled Packaging", retrieved on Feb. 19, 2018 from http://coolpac.com.

Omega; "Temperature monitoring during transportation, storage and processing of perishable products"; retrieved on Feb. 19, 2018 from https://www.omega.com.

Badia-Melis, et al.; "Refrigerated fruit storage monitoring combining two different wireless sensing technologies: RFID and WSN", Sensors, 2015, vol. 15, pp. 4781-4795.

Pelican Biothermal; "Glossary", retrieved from http://pelicanbiothermal.com on Feb. 19, 2018.

Pelican Biothermal; "Blood Supplies", retrieved from http://pelicanbiothermal.com on Feb. 19, 2018.

Polar Tech; "Insulated shipping kit, . . . ", retrieved from https://www.grainger.com on Feb. 19, 2018.

True Pack; "Blood Shippers", retrieved on Feb. 19, 2018 from http://www.truepack.com.

Swedberg, Claire; "Wake Forest Baptist develops system for tracking blood temperature", RFID Journal, 2011.

Tech Instrumentation; "TRIX-8 Data Logger", retrieved on Feb. 19, 2018 from http://techinstrument.com.

Imbabi, Mohammed Salah-Eldin; "A passive-active dynamic insulation system for all climates"; International Journal of Sustainable Built Environment (2012) 1, 247-258.

Wikipedia; "Dynamic Insulation"; retrieved on Apr. 9, 2020 from https://en.wikipedia.org/wiki/Dynamic_insulation.

* cited by examiner

Blood Storage and Transportation Requirements

| Blood Product | Condition | Temperature Range | Transport/ Storage Time | Transport/ Storage Equipment |
|---|---|---|---|---|
| Whole blood and packed red cell | For transport to another center (steps 202, 204) | +1 °C to +10 °C | Depends on qualified duration of the container | Qualified container having sufficient cooling materials |
| Whole blood and packed red cell | For storage in blood center (steps 203, 205) | +1 °C to +6 °C | 35 days | Blood bank / Hospital refrigerator |
| Platelet concentrates | For transportation to another center (step 204) | +20 °C to +24 °C | 24 hours (maximum time without agitation) | Qualified container having sufficient temperature stabilization materials |
| Platelet concentrates | For storage in blood center (steps 203, 205) | +20 °C to +24 °C | 5 to 7 days | Platelet incubator with agitator |
| Fresh frozen plasma | For storage in blood center (steps 203, 205) | Frozen state (below −18 °C) | 12 months from collection | Plasma freezer |
| Fresh frozen plasma | For transport to another center (step 204) | Frozen state | Transported until maintained in frozen state | Qualified container having sufficient cooling materials |
| Packed red cells, thawed plasma | Blood components issued for transfusion (step 206) | +1 °C to +6 °C | Depends on qualified storage duration of the cooler | Portable coolers |

Sources: AABB, WHO

SYSTEM FOR THERMALLY-MANAGED TRANSPORTATION AND STORAGE OF SETS OF RELATED SPECIFIC PERISHABLE PRODUCTS

FIELD OF THE INVENTION

The invention generally relates to containers for transportation of sets of related specific perishable materials such as blood components and multi-part biologics, pharmaceuticals, specimens, foods, and chemicals.

BACKGROUND OF INVENTION

Blood and blood products must go through a series of steps—collection, testing, packaging, transportation, storage, and preparation—before they are transfused into the patient. This is known as the "blood transfusion supply chain", which may be defined as a temperature-controlled supply chain. At each step in the blood supply chain, precise temperatures must be maintained to ensure the integrity of the blood products. If the blood or blood product (e.g., blood component) is allowed to become too cold or too warm, then the blood products may become unusable. Other perishable products, such as tissues, organs, biological samples, food and food components, and certain chemicals share similar requirements to maintain temperature within a certain range during storage and transport.

SUMMARY OF THE INVENTION

Disclosed is an improved shipping and storage system for a set of specific related components, such as blood product components, which conveys the components in pre-determined ratios, having a thermally-insulated main container with a plurality of internal chambers, and at least one attached auxiliary container which is thermally-insulated. Optionally, the system is provided with wheels and a collapsible handle for easy movement of one system, and configured for stacking of multiple similar systems for bulk transportation.

BRIEF DESCRIPTION OF THE DRAWINGS

The description set forth herein is illustrated by the several drawings.

DETAILED DESCRIPTION OF EMBODIMENT(S) OF THE INVENTION

The inventors of the present invention have recognized a problem not yet recognized or solved by those skilled in the relevant arts. Blood banks, diagnostic labs, and hospitals often use blood transport and storage systems, containers, and enclosures that may not have been designed or ideally suited for that purpose. This creates inefficiencies in handling, and requires time-consuming validation to remain compliant with regulations. Blood products are costly, and any spoilage can cause shortages and put human lives at risk. And any avoidable losses affect the financial results for the blood banks and hospitals handling those products. The inventors have recognized that a more reliable, cost-effective solution for transporting blood products is needed. The present invention provides certain technological improvements for this purpose.

Figure 2:
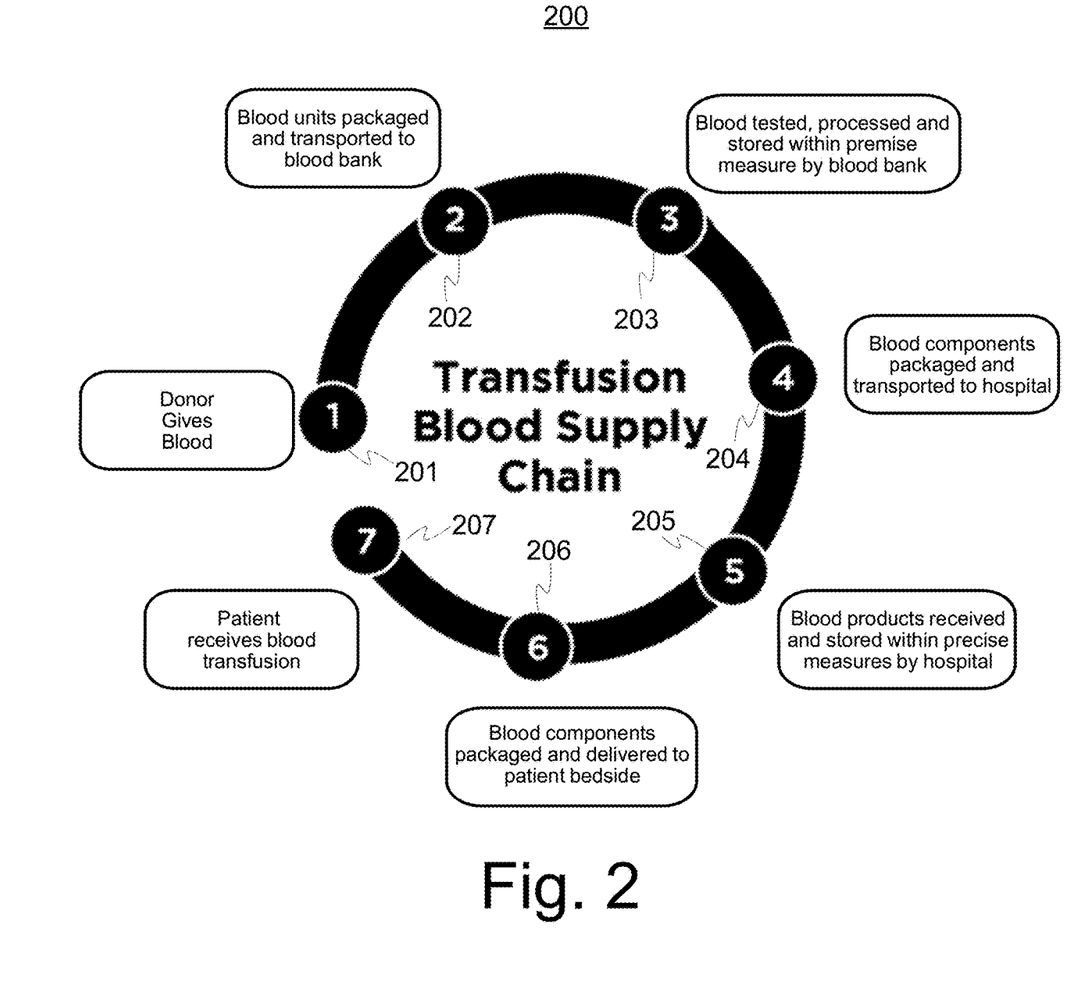
FIG. 2 depicts a typical blood supply chain.

The inventors have further realized that the modern blood supply chain includes at least seven (7) points of failure where any delays, miscommunications, or procedural issues can cause serious problems with the quality and usability of the blood product. As shown in FIG. 2, steps in the modern blood supply chain (200) typically include, but are not limited to:

(201) The donor gives blood.

(202) After donation, blood units and donor blood specimens are placed into storage containers and transported to the blood bank which may be many miles away.

(203) At the blood bank, the blood is tested, processed, and stored according to precise specifications determined by the blood bank in compliance with corporate, state, national, international and/or association standards, such as the standards promulgated by the American Association of Blood Banks (AABB) in the United States.

(204) When ordered, blood products are again placed within cold storage containers and transported to the hospital or other location where blood is needed.

(205) When received by the hospital, the blood products are again stored according to precise specifications determined by the hospital in compliance with the relevant storage and handling standards.

(206) When ordered by the physician, blood products are packaged and delivered to the patient's bedside.

(207) Finally, the blood is transfused into the patient as needed, over a period of time, during which time additional units of blood may be stored next to the patient's bed while the patient receives a unit via transfusion.

Each of these seven generalized steps represents a possible point of failure where any delays, miscommunications, or procedural issues can cause serious problems. Further, some units of blood or blood components may be returned to the blood bank, such as when the patient no longer requires the blood products. However, return and restocking of blood products requires a number of conditions to be met by most handling and storage standards:

(a) The container closure has not been disturbed.
(b) The appropriate temperature range has been maintained.
(c) For red blood cell components, at least one sealed segment of integral donor tubing has remained attached to the bag. Removed segments shall be reattached only after confirming that the tubing identification numbers on both the removed segment(s) and the bag are identical, and
(d) The storage, handling and transportation records indicate that the blood, blood component, tissue, or derivatives have been inspected and that they are acceptable for reissue.

Blood products represent an expensive and labor-intensive resource, reportedly accounting for approximately 1% of hospital expenditures. Yet the transportation and storage of blood products is often an inefficient and costly process. This is due to the complexity of the supply chain: the series of refrigerated production, storage and distribution activities, equipment, and logistics required to maintain a desired low-temperature range.

Figure 3:
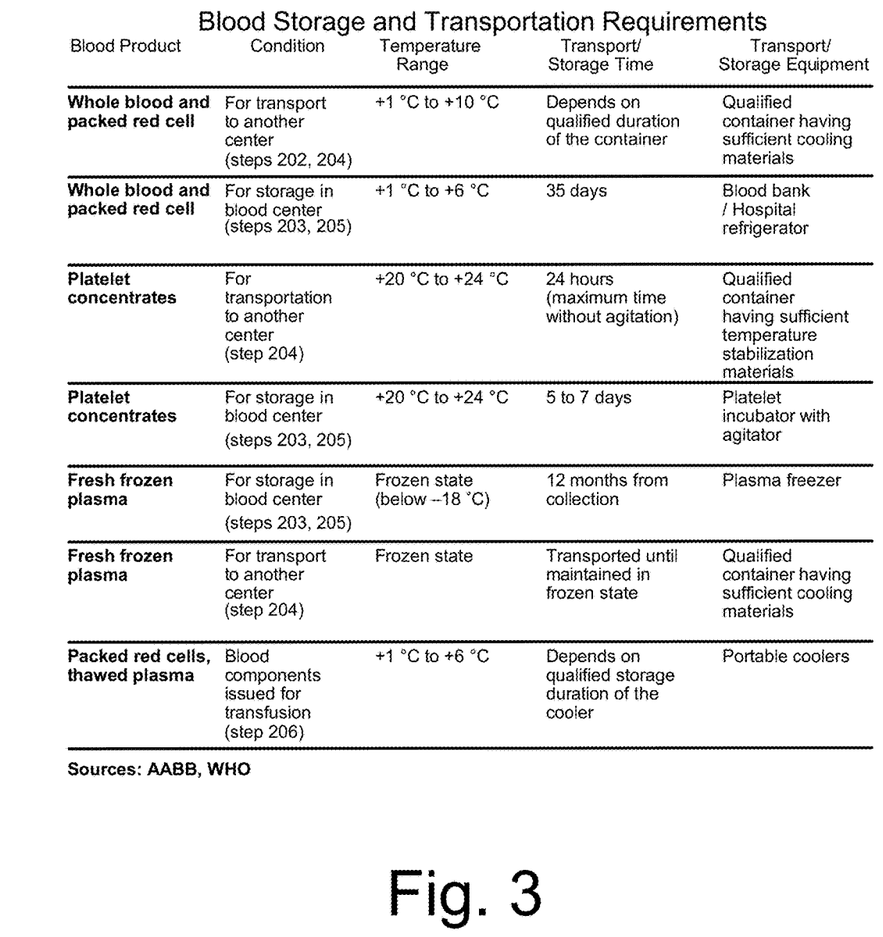
FIG. 3 sets forth an exemplary set of pre-determined storage and handling thresholds (temperature, accrued time, etc.) for a plurality of specific payload types (blood products).

As shown in FIG. 3 and according to the AABB and the World Health Organization (WHO), blood products must be maintained within a critical range of temperatures during a short timeframe to remain viable. The steps listed under "Condition" in FIG. 3 refer to the steps in the blood supply chain shown in FIG. 2. These include five out of seven steps where delays, miscommunications, or procedural issues can cause blood products to go out of safe temperature range. This is also true for blood and blood components being returned to the blood bank or transfusion service.

Red blood cell (RBC) product wastage in hospitals is reported to range anywhere from 0.1% to 6.7%. In one study, approximately 87% of wasted RBC units were either individual units that were out of blood bank for more than 30 minutes (dispensed but not administered) or units packed in transport containers with temperature indicators affixed to each unit.

Factors identified as contributors to RBC wastage most amenable to improvement were lack of awareness and training of staff ordering and handling RBC products, management of temperature-validated containers, inconsistent interpretation of RBC temperature indicators, and need for accountability when ordering blood products.

The cost of blood wastage is significant. In the National Blood Collection Utilization Survey in 2011, the annual direct cost of intraoperative RBC wastage at one medical center was reported to have amounted to approximately $249,000, based on a direct cost of $225 per unit of leuko-reduced RBCs, excluding costs associated with the procurement, management, storage, and issue of these products. In other reports, the comprehensive cost of a unit of transfused RBC can range between $1,800 to $3,000 per unit.

The present inventors have further recognized the following shortcomings in the blood chain management equipment, systems, technologies, and procedures which are in current use. Cardboard boxes lined with foam insulation on the inside or molded plastic coolers such as a recreational storage boxes made by Igloo™ are the industry standard components employed for packaging and storage of temperature sensitive products in this blood transfusion supply chain. The many drawbacks recognized by the inventors to these existing blood chain management equipment, systems, technologies, and procedures, can be categorized as follows:

Inconsistent thermal properties leading to low quality or low effectiveness;

Lack of payload status monitoring and feedback to the end user;

No built-in feedback mechanism that can provide payload efficacy status;

Time-consuming and laborious compliance or validation processes; and

Excessive costs, including shipping.

Consumer-grade coolers, such as those manufactured by Igloo™, Rubbermaid™, etc., which are often used for internal transport within hospitals, are generally fabricated from high-density plastic lined with 1.5 to 3 inches of foam insulation, and then the interior of the cooler is filled with crushed ice, leaving only 20% to 30% of the interior volume usable for storage and transport of blood products. Most of these consumer-market coolers are not designed for precision insulating, so they have non-uniform temperature distribution with hot and cold zones within them. Whereas the manufacturers of these coolers are unaware of their potential use for life-saving purposes, the manufacturing of these coolers is potentially widely variable over time and production runs. The typical foam-lined cardboard box uses Styrofoam with just insulation rating of R-3 to R-4 per inch, or polyisocyanurate with R-5 to R-7 per inch. While these boxes are low-cost, they provide limited performance in demanding settings, such as longer transport times, or storage at the bedside of a patient who requires continuous lower-volume transfusions. Additionally, because different blood products require different temperature ranges for packaging, the insulation, cooling material, and pack-out of each blood product must be varied based on the type of blood product being packaged and transported, leading to unnecessary complexity in procedures as well as increased possibility of human error leading to damage of the blood product. Still further, the existing materials and procedures used by blood banks and hospitals have little flexibility to size up or down according to the requirements of each shipment. This adds even more inefficiencies and higher costs.

Finally, the present inventors have taken notice that many blood banks and hospitals today use an arbitrary collection of packaging materials that requires an extensive set of pack-out evaluations.

To solve these shortcomings, the present inventors set out to design and verify blood chain management equipment, technologies, and procedures which provide a pre-validated system of integrated packaging and components that are faster and simpler to evaluate, use, and comply with applicable standards and procedures.

Still further, the present inventors, when studying the blood supply chain, noticed that an increasing number of patients are transfused with all three components—red blood cells, warm plasma, and platelet—of blood at the same time. However, most blood banks collect and store these three components separately, so they are shipped and stored by the hospitals separately, as well. Because these three components are administered to a patient in a pre-determined ratio by volume, the present inventors have realized that the art will be well served by a shipping and storing system which conveys all three components in the same ratio as that which they are administered. There are many other examples in which related supplies that are consumed in certain ratios experience critical shortages of one or more of the set of components. In this particular market space of blood supply chain management, hospitals and trauma units may infuse to apply a set of all three blood components to a patient, but find they are in short supply of one component or another.

To answer this unaddressed problem in the art, the present inventors have improved and adapted a thermally-managed blood and biologics storage and transportation system to convey a pre-determined ratio of multiple related components (sets of components) based upon the product being handled. While the following example embodiments will be set forth in terms of three-part sets of blood components, it will be recognized by those skilled in the art that other multiple-part sets of components of other products can benefit from other embodiments of the present invention.

In a particular embodiment of the present invention, three related specific components of blood product are stored and transported as a set in pre-determined ratios by volume. While the exemplary embodiment will disclose pre-determined ratios of volumes of components of the set, it will also be recognized by those skilled in the art that other embodiments may employ ratios based on other measurements, such as a weight, volume, temperature stability, potency, cost, and value.

Figure 4:
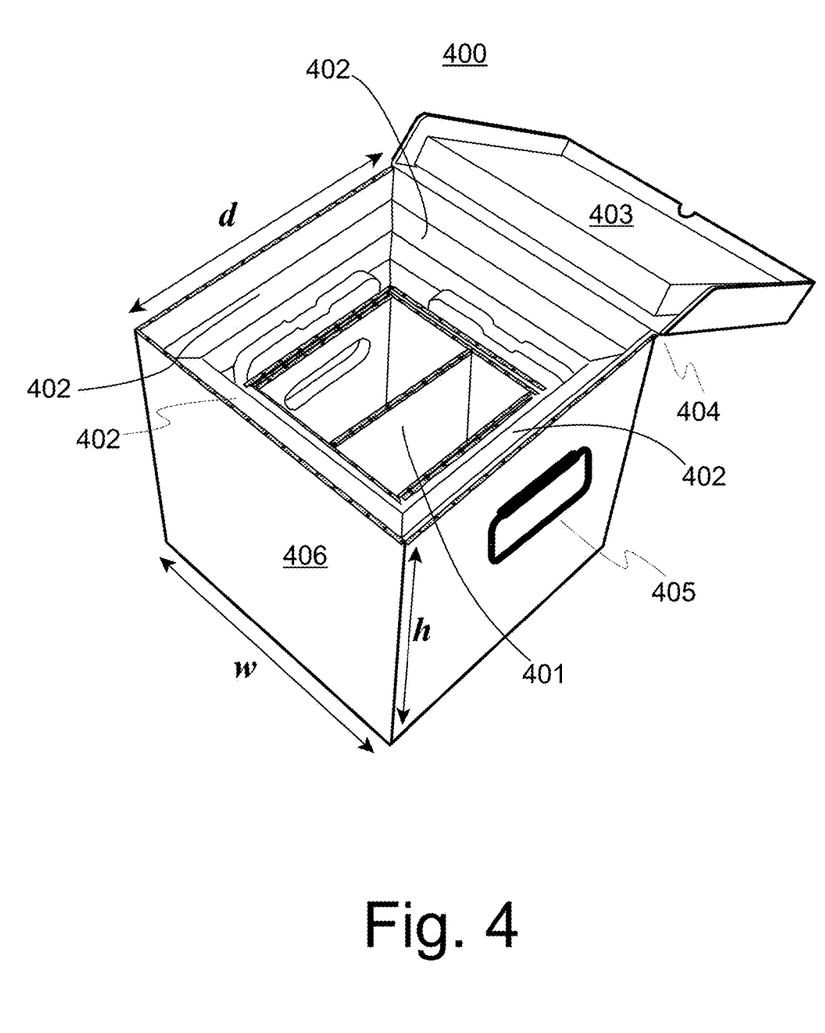
FIG. 4 provides a photograph of a prototype according to at least one embodiment of the present invention with the lid open, a dual-chamber payload carrier received into the interior of the main container, and four cooling packs installed between the payload carrier and between the insulated walls of the container.

FIG. 4 illustrates an advanced multi-part blood transport container system (400) from MaxQ Research LLC of Stillwater, Okla., in a condition with a top or lid (403) open, which has external dimensions of 14" for width w, height h and depth d. Overall exterior dimensions of this exemplary embodiment, with external accessories, are 15.25" by 17.5" by 16.5".

A dual-chamber payload carrier (401) has dimensions of 8.5" by 8.75" by 9.75" for width, height, and depth, respectively, and it is divided into two approximately equal-volume chambers, which we will refer to as first and second chambers for the purpose of this disclosure. The payload carrier (401) is surrounded by one or more layers of corrugated plastic side panels, back panel, and front panel, with one or more layers of insulation material, and one or more layers of freezable packs (water, gel, phase change, etc.) (402), as shown, yielding two chambers, each having dimensions of 3.75" by 8.75" by 9.75". A lid (403) is preferably attached to the rear panel of the main container (406) by a thermoplastic hinge (404), and the top has a lip around the side edges and front edge which descends downward when closed to surround the top edge of the side panels and front panel. This particular transport embodiment of the container system is also provided with accessories including a pair of handles (405) on the left and right sides for each of lifting and moving the loaded container, as well as an integrated wheeled dolly or cart with handle (hidden from view on the bottom and back panels of the main container).

While this transport carrier will be used to illustrate one particular embodiment of the present invention, and while this particular structure itself is new and novel, other embodiments of the present invention may be realized with other transport and storage containers, such as those mentioned in the foregoing paragraphs.

Figure 5:
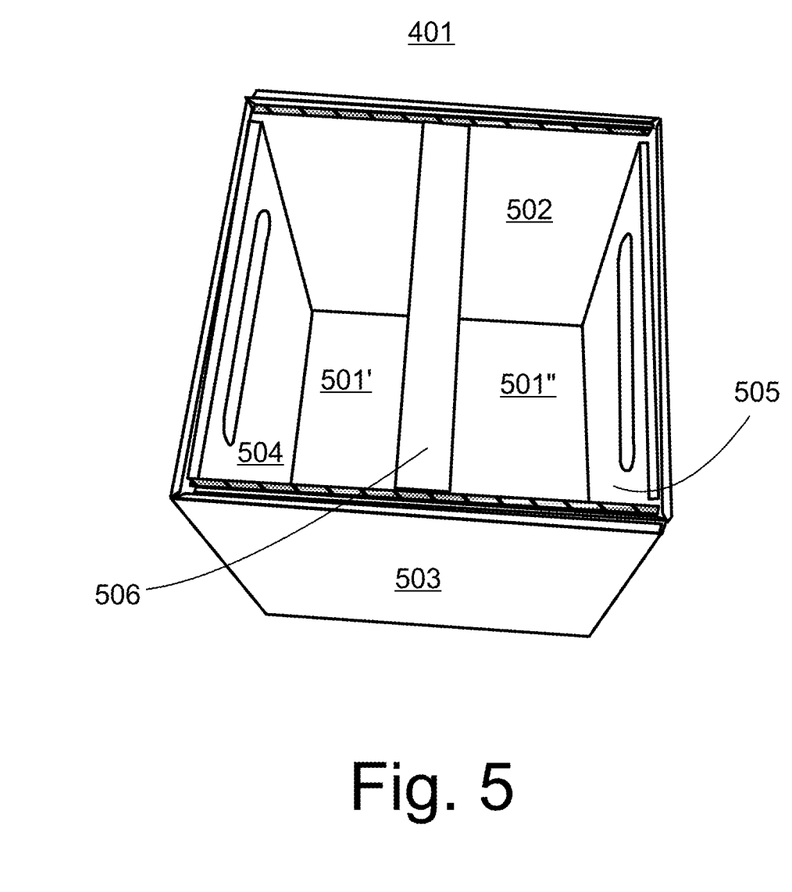
FIG. 5 provides a photograph of the payload carrier shown in the prototype of FIG. 4 to provide more details of the thermally-buffering separator between the first and second chambers.

The present exemplary embodiment is realized by several improvements and modifications to the transport container (400), including the addition of at least one separator (506) within the payload carrier (401) to form at least a first and a second chamber (501', 501" respectively), bounded by the front wall (503), the left wall (504), the back wall (502), and the right wall (505 of the payload carrier, sharing a bottom panel, as shown in FIG. 5. Each side wall (504, 505) is preferably provided with an elongated slot for a handle to aid in placing and removing the carrier (401) within the main container (406). The chamber separator (506) is preferably constructed of multiple layers of corrugated plastic sheeting to provide a thermal buffer between the first chamber (501') and the second chamber (502'). The chamber separator (506) may also be constructed of thermal insulation material that can prevent transfer of heat between the first chamber (501') and the second chamber (502'). Further, the chamber separator (506) may also contain a layer of energy absorbing dynamic insulation material separating the first chamber (501') from the second chamber (502'). Similarly, the side walls of the carrier are preferably constructed of several layers of corrugated plastic sheet, as well.

Figure 6:
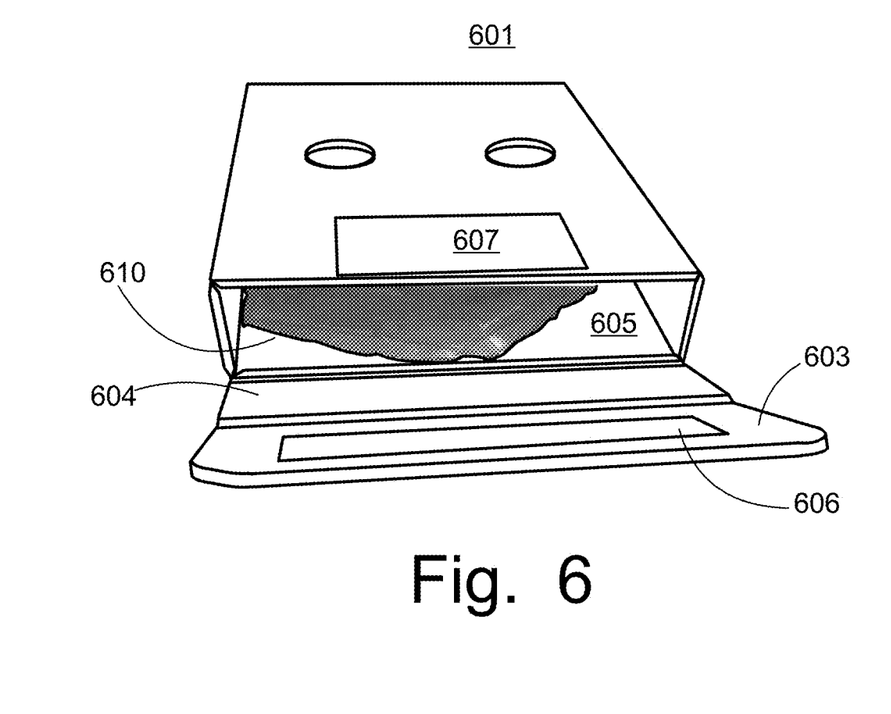
FIG. 6 shows an exemplary embodiment of a thermally insulated auxiliary container for storing and conveying a related component outside of the thermally-controlled interior of the main container.

A third chamber is provided as an external pouch or pocket (601) to the advanced multi-part blood transport container system (400) of the exemplary embodiment, as shown in FIG. 6. As shown in FIG. 6, sheets of corrugated plastic are cut, bent, folded and shaped to have an outer wall (602), a double hinged flap (603, 604), sides, and a bottom, to define the third chamber (605) to receive a liquid payload (601). Flap closures (606, 607), such as hook-and-loop strips, secure the contents (610) of the pocket during storage and transportation. In this particular exemplary embodiment for transportation of proportional volumes of a set of three related blood components, the dimensions of the third chamber are approximately 8.25" by 11.75" by 2.25", including provision of a dynamic energy absorbing insulation layer to buffer against rapid or quick temperature changes.

Figure 1:
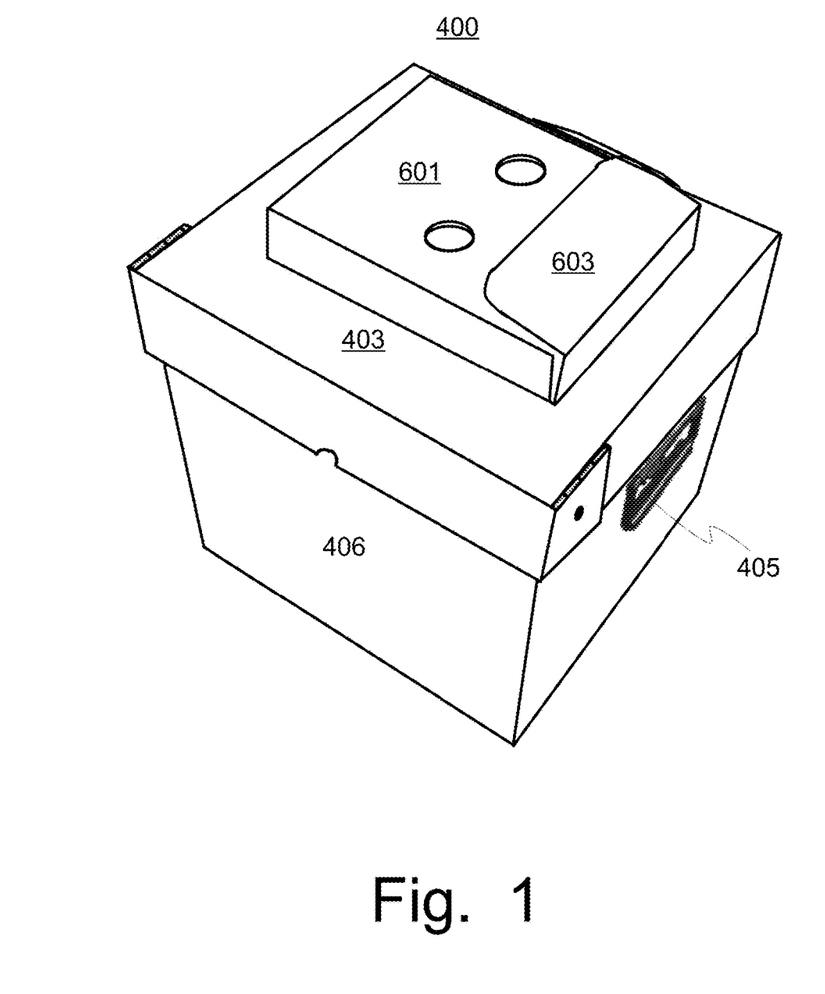
FIG. 1 illustrates an external view of at least one exemplary embodiment of the present invention.

Referring now to FIG. 1, the advanced multi-part blood container system (400) is shown with the lid (406) closed over the dual-chamber payload carrier (obscured from view in this mode), and the external third chamber pocket (601) which is maintained at ambient temperature is shown attached to the lid (403) with the flap (603) closed. Not visible in this view is a set of castors, rollers or wheels on the bottom of the main container (406), and a retractable handle on the back of the main container. Together with the side handles (405) on the main container, a single person can transport a set of related blood components in a pre-determined ratio for a particular consumption.

In this particular exemplary embodiment, three related components of blood, which we refer to as a set of related components, are accommodated by the physical dimensions of the three chambers, so that storage and shipping of the three components is achieved in the specific ratio in which they are typically consumed during transfusion. The nominally 14" by 14" by 14" cube container with external auxiliary container system (400) can hold 1-6 units of typically packaged red blood cells in the first thermally insulated chamber (501'), 1-6 units of typically packaged plasma in the second thermally insulated chamber (501"), and 1-2 units of typically packaged platelet in the third insulated chamber (601). In this specific configuration, the red blood cells compartment is maintained at the preferred temperature range of 1-6° C., as is the plasma compartment, while the stored platelets are maintained at the preferred 20-24° C. This unit, proportional storage and shipping containment system reduces or eliminates what is known as "bench time" in the vernacular of the art of blood transfusion, which refers to the need in other storage and transportation methods to allow refrigerated or frozen components to thaw or come up to useful temperature while laying on a bench top as a slow cold sink (slow heat source).

Figure 7:
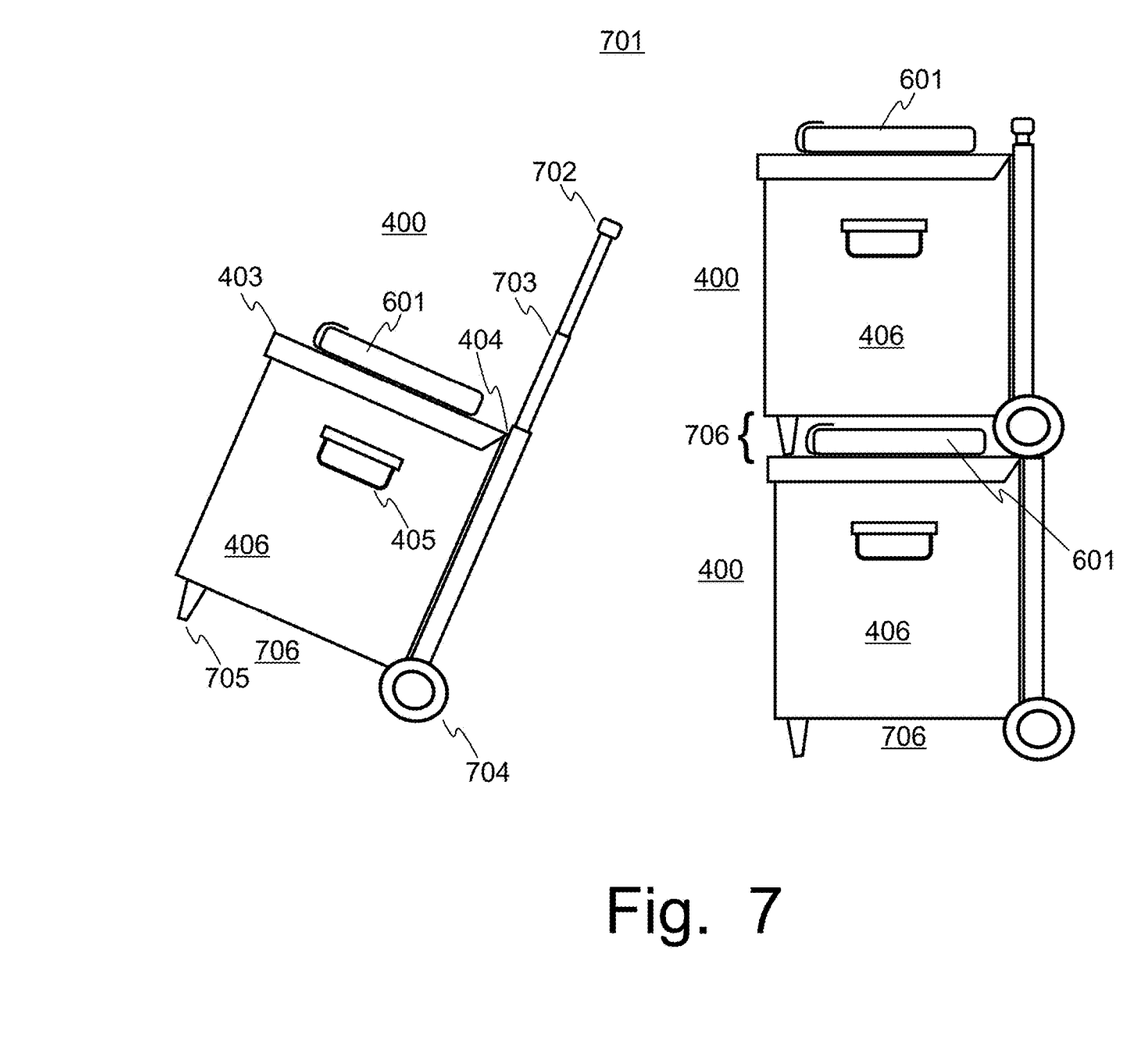
FIG. 7 illustrates optional external accessories including a set of wheels, extendable handle, and feet which allow for single-person conveyance of a loaded system, as well as vertical nesting and stacking of like systems.

Referring now to FIG. 7, more details of the external accessories (701) of at least one exemplary embodiment of the present invention are shown. Each shipping container system (400) is provided with a set of wheels (704), a telescoping handle and draw bar (702, 703), and a corresponding set of feet (705) which allow a single, fully loaded system to be conveyed easily by one person by tipping and rolling it on the wheels. In this particular preferred embodiment, the feet (705) and wheels (704) are dimensioned such that a space (706) is formed below the main container (406) which can accommodate the external pouch (601) when the systems are stacked vertically on top of each other. This promotes lower cost and more space-efficient shipping options, while also allowing for quick and easy distribution of the individual shipping systems to specific rooms and patients upon arrival at a hospital receiving dock.

Figure 8:
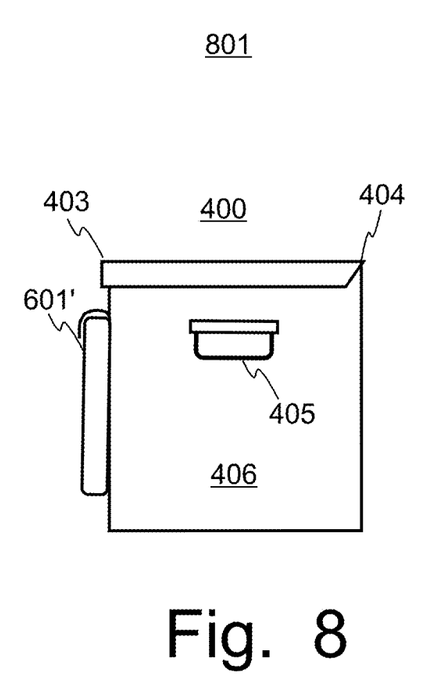
FIG. 8 shows another embodiment according to the invention from a side view having an auxiliary container affixed to a side panel of the main container, and in particular, to a front panel opposite the panel where the lid is hinged.

FIG. 8 illustrates (801) a side view of an embodiment in which the external pouch (601') may be affixed to a side panel to the main container (406), such as a front panel opposite of the back panel where the lid is hinged (404). This external pouch may be constructed similarly to the lid-mounted pouch (601), and may be used alternatively (3 chambers total) or in conjunction with (4 chambers total) the lid-mounted pouch.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A shipping and storage system comprising:
   a main container having a lid, four side walls, and a bottom, defining within it a thermally-insulated compartment;
   a multi-chamber payload carrier having at least a first chamber and a second, separate chamber, defining at least a first volume and at least a second volume, physically receivable within the thermally insulated compartment to assemble the first and second volumes into at least two components of a pre-validated system of integrated packaging being previously validated against a predetermined performance standard for a specific payload type; and
   at least one auxiliary payload carrier defining at least a third chamber having a third volume, the auxiliary payload carrier being affixed externally to the thermally-insulated compartment of the main container, thereby providing a third component of the pre-validated system of integrated packaging;
   wherein the at least first, second and third volumes comprise at least three volumes according to a set of related biological components of specific payload type; to be stored and conveyed in a predetermined set of volumetric ratios which match pre-determined consumption ratios of the set of related biological components.

2. The shipping and storage system as set forth in claim 1 wherein the first and second chambers of the multi-chamber payload carrier are separated by a thermal buffer layer.

3. The shipping and storage system as set forth in claim 1 wherein the related biological components comprise three different components of a blood product.

4. The shipping and storage system as set forth in claim 2 wherein the first volume and the second volume comprise a 1:1 ratio, while the third volume comprises a 1:3 ratio to the first volume and second volumes.

5. The shipping and storage system as set forth in claim 3 wherein the first volume and the second volume are configured to receive one to six standard packaged units of red blood cells and plasma, respectively, and wherein the third volume accommodates one to two standard packaged units of platelets, with minimal unoccupied volume.

6. The shipping and storage system as set forth in claim 5 wherein the first and second chambers of the payload carrier are previously validated against a predetermined performance standard to maintain red blood cells and plasma, respectively, in a temperature range of 1-6° C., and the third chamber of the auxiliary payload carrier is previously validated against a predetermined performance standard to maintain platelets in a temperature range of 20-24° C.

7. The shipping and storage system as set forth in claim 1 wherein the auxiliary payload carrier comprises an external pocket with a flap which encloses the third chamber.

8. The shipping and storage system as set forth in claim 1 further comprising a lining of an energy absorbing dynamic thermal insulation material disposed between the first chamber and the second chamber.

9. The shipping and storage system as set forth in claim 1 wherein the auxiliary payload carrier is affixed externally to the lid of the main container.

10. The shipping and storage system as set forth in claim 1 wherein the auxiliary payload carrier is affixed externally to a side wall of the main container.

11. The shipping and storage system as set forth in claim 1 further comprising a set of wheels disposed on the bottom of the main container and a handle on at least one side of the main compartment for conveyance of the system.

12. The shipping and storage system as set forth in claim 6 further comprising a set of wheels and feet disposed on the bottom of the main container and a handle on at least one side of the main compartment for conveyance of the system, wherein a height of the feet and wheels define a space beneath the bottom of the main compartment and above a supporting surface upon which the wheels and feet rest sufficient to accommodate an auxiliary payload carrier of a second, like system, to facilitate stacking of like system upon like systems.

13. A shipping and storage system comprising:
- a main container having a lid, four side walls, and a bottom, defining within it a thermally-insulated compartment;
- a multi-chamber payload carrier having at least a first chamber and a second, separate chamber, defining at least a first volume and at least a second volume, physically receivable within the thermally insulated compartment to assemble the first and second volumes into at least two components of a pre-validated system of integrated packaging being previously validated against a predetermined performance standard for a specific payload type;
- at least one auxiliary payload carrier defining at least a third chamber having a third volume, the auxiliary container being affixed externally to the thermally-insulated compartment of the main container, thereby providing a third component of the pre-validated system of integrated packaging;
- a set of wheels and feet disposed on the bottom of the main container for conveyance of the system, wherein a height of the feet and wheels define a space beneath the bottom of the main compartment and above a supporting surface upon which the wheels and feet rest sufficient to accommodate an auxiliary payload carrier of a second, like system, to facilitate stacking of like system upon like systems.
- wherein the at least first, second and third volumes comprise at least three volumes according to a set of related biological components of specific payload type; to be stored and conveyed in a predetermined set of volumetric ratios which match pre-determined consumption ratios of the set of related biological components.

14. The shipping and storage system of claim 13 further comprising a handle disposed on at least one side of the main compartment.

15. The shipping and storage system as set forth in claim 13 wherein the first and second chambers of the multi-chamber payload carrier are separated by a thermal buffer layer.

16. The shipping and storage system as set forth in claim 13 wherein the related biological components comprise three different components of a blood product.

17. The shipping and storage system as set forth in claim 16 wherein the first volume and the second volume comprise a 1:1 ratio, while the third volume comprises a 1:3 ratio to the first volume and second volumes.

18. The shipping and storage system as set forth in claim 16 wherein the first volume and the second volume are configured to receive one to six standard packaged units of red blood cells and plasma, respectively, and wherein the third volume accommodates one to two standard packaged units of platelets, with minimal unoccupied volume.

19. The shipping and storage system as set forth in claim 18 wherein the first and second chambers of the payload carrier are previously validated against a predetermined performance standard to maintain red blood cells and plasma, respectively, in a temperature range of 1-6° C., and the third chamber of the auxiliary payload carrier is previously validated against a predetermined performance standard to maintain platelets in a temperature range of 20-24° C.

20. The shipping and storage system as set forth in claim 13 wherein the auxiliary payload carrier comprises an external pocket with a flap which encloses the third chamber.

* * * * *